Dec. 19, 1967   M. E. BALL ETAL   3,358,537
CUTTING APPARATUS
Filed Nov. 16, 1964                                    4 Sheets-Sheet 2

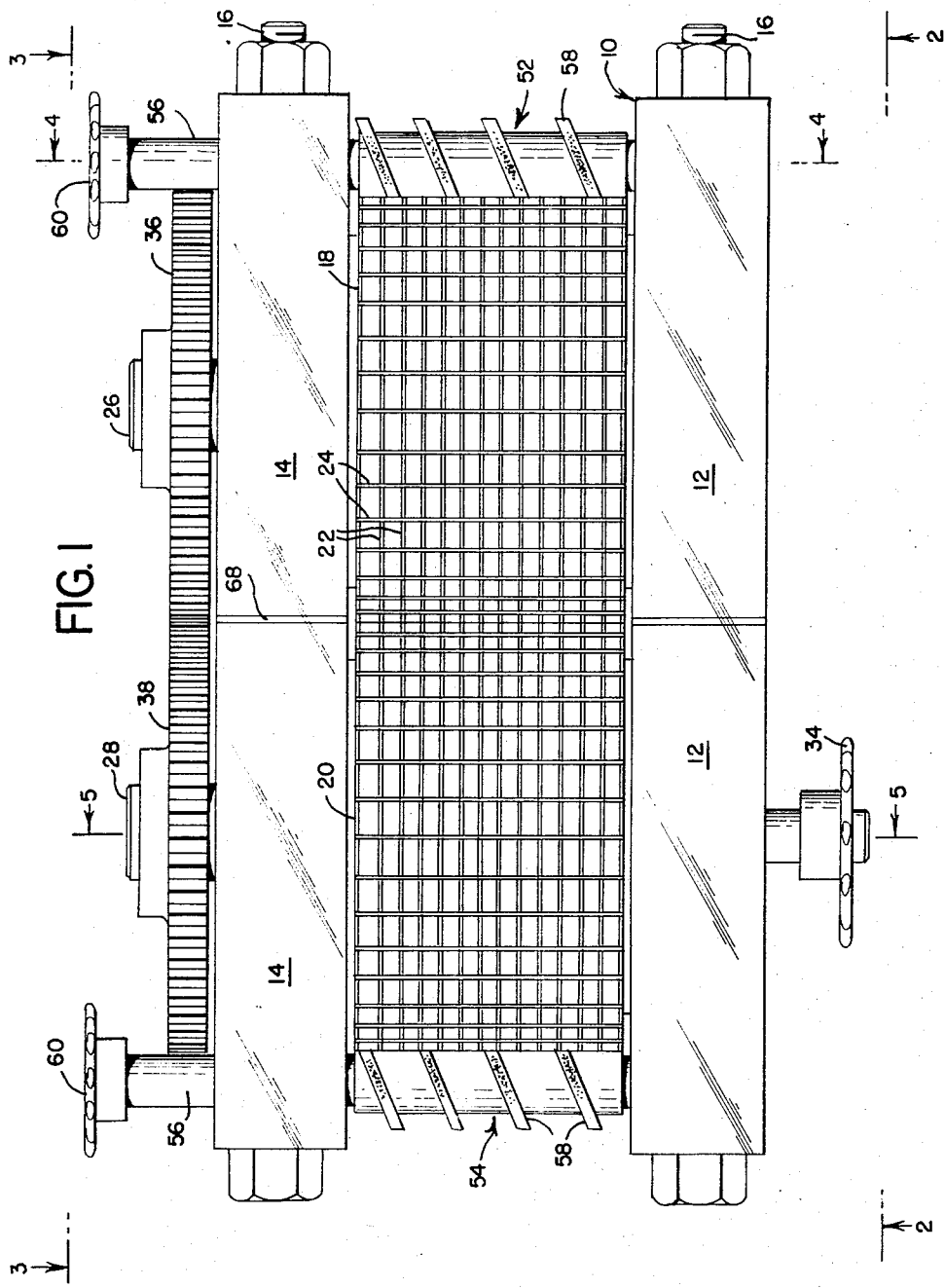

INVENTORS
MURRAY E. BALL
WILLIAM L. McKOWN
PHILIP K. ZIETLOW
BY
*Robert B Hughes*
ATTORNEY Dec. 19, 1967 M. E. BALL ET AL 3,358,537
CUTTING APPARATUS Filed Nov. 16, 1964 4 Sheets-Sheet 3

INVENTORS
MURRAY E. BALL
WILLIAM L. McKOWN
PHILIP K. ZIETLOW
BY Robert B. Hughes
ATTORNEY Dec. 19, 1967   M. E. BALL ET AL   3,358,537
CUTTING APPARATUS
Filed Nov. 16, 1964   4 Sheets-Sheet 4

INVENTORS
MURRAY E. BALL
WILLIAM L. McKOWN
PHILIP K. ZIETLOW
BY *Robert B. Hughes*

ATTORNEY

United States Patent Office 3,358,537
Patented Dec. 19, 1967

3,358,537
CUTTING APPARATUS
Murray E. Ball, Rockford, William L. McKown, Minneapolis, and Philip K. Zietlow, Northfield, Minn., assignors to General Mills, Inc., a corporation of Delaware
Filed Nov. 16, 1964, Ser. No. 411,430
12 Claims. (Cl. 83—101)

This invention relates generally to an apparatus to form a plurality of pieces or units from a pliable material such as moist cooked dough.

The present invention is particularly adapted to accomplish a step in a food making process in which two sheets of cooked dough (each sheet being about .05 inch thick) which lie against one another are cut with blunt edges in a criss-cross pattern. The blunt cutting edges seal the dough sheets one to another along the lines of cutting, and the effect is to form a plurality of moderately small (i.e. about a half inch across) square, dual-layered dough pellets, each of which is sealed about its entire perimeter. These pellets are subsequently dried and tempered, and then puffed and toasted to make finished cereal biscuits each having a rounded configuration and defining a relatively large closed cavity.

The apparatus of the present invention is concerned with the operation of cutting the two dough sheets to form the dual layered pellets. The dough which is being so cut has a moisture content of about 30%, this making the dough quite pliable and creating a tendency for the dough to stick to whatever instrument is doing the cutting. In the food industry, the handling of moist cooked dough in any form has been somewhat of a problem. However, a particular problem is encountered when the dough is formed in sheets and then made into pellets on a full scale production operation, in that to obtain a sufficiently high rate of output a plurality of blunt cutting edges are used, which means that recesses are necessarily formed between proximate cutting edges. The dough pieces being cut have a tendency to squeeze into these recesses, and will generally not readily fall free of these recesses simply from the pull of gravity. It is quite difficult to dislodge the dough pieces from these recesses without causing any crushing, tearing or other deformation of the dough pieces.

Among the various approaches taken to solve these problems have been the use of different arrangements of brushes to stroke the dough pieces out of the recesses, placing movable fingers or air-jets in the bottom of the recesses and causing the fingers to move out or the air jets to operate to move the dough pieces free of the recesses, coating or otherwise treating the material which forms the surfaces of the recesses, etc. Yet none of these solutions have been wholly satisfactory. In some cases the dough pieces are handled too roughly, while in other instances the dough pieces are not consistently moved free of the recesses. Sometimes the apparatus has operational problems (e.g. clogging of air jets or contamination of the dough product), and sometimes simply the expense of the equipment leads one to look for more economical solutions. In short, it may be said that this is still a very knotty problem in the food processing art.

Thus it is a principal object of the present invention to provide an apparatus in which a material such as moist cooked dough is cut into pieces, and the pieces are easily and effectively removed from the apparatus without deforming or otherwise damaging the pieces to any appreciable degree.

It is a more particularly object to provide such an apparatus especially adapted for an operation in which two or more sheets of dough are cut with a plurality of blunt edges to form multi-layered pellets, each of which is sealed at the perimeter thereof, and the pieces are easily and effectively removed from the recesses defined by proximate cutting edges.

These and other objects and features of the invention will be more readily understood and appreciated from the following detailed description of the preferred embodiment thereof selected for purposes of illustration and shown in the accompanying drawings, in which:

FIGURE 1 is a top plan view of the apparatus of the present invention;

Figure 3:
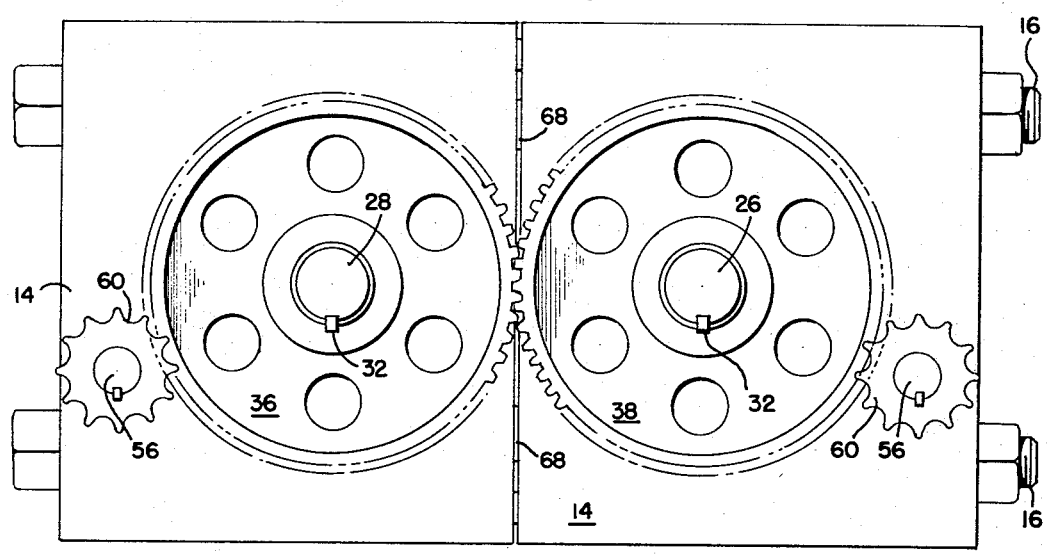
FIGURE 3 is a rear elevational view taken from the location indicated at 3—3 of FIGURE 1.
Figure 2:
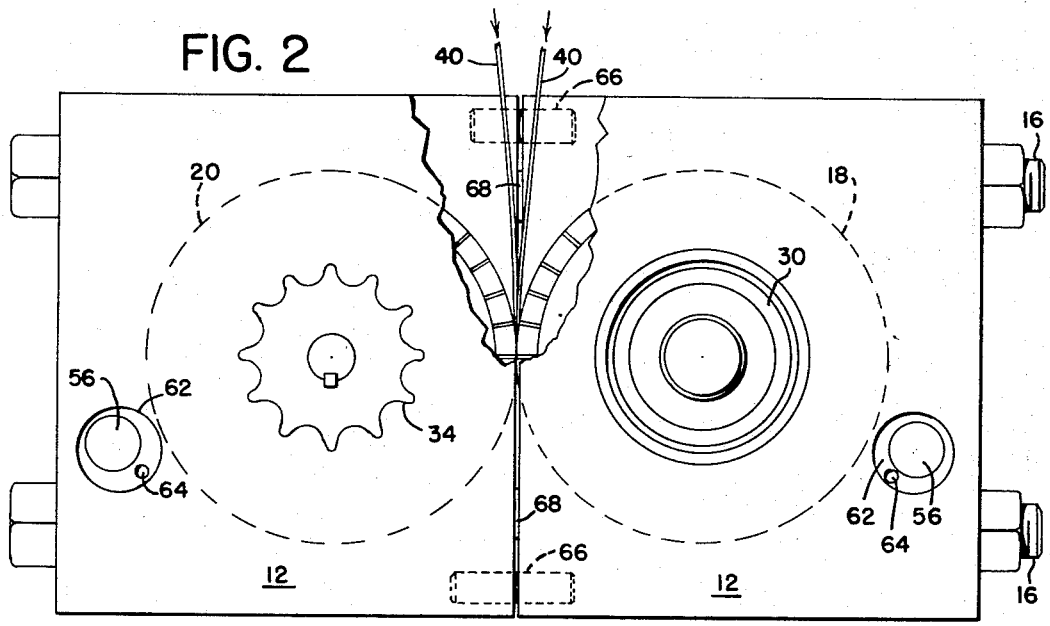
FIGURE 2 is a front elevational view taken from the location indicated at 2—2 of FIGURE 1.
Figure 4:
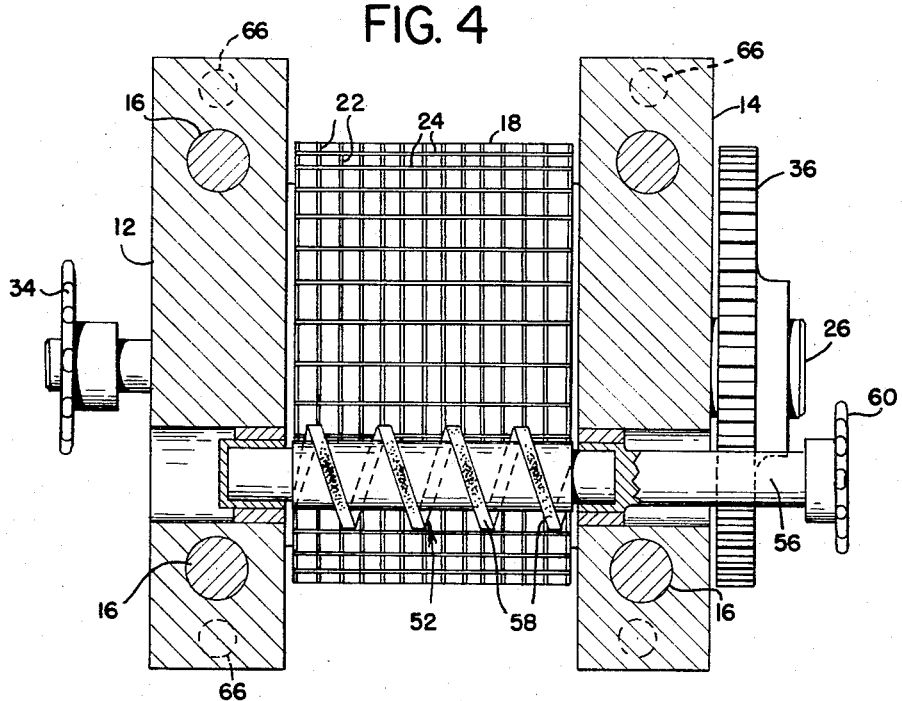
FIGURE 4 is a longitudinal sectional view taken along line 4—4 of FIGURE 1.
Figure 5:
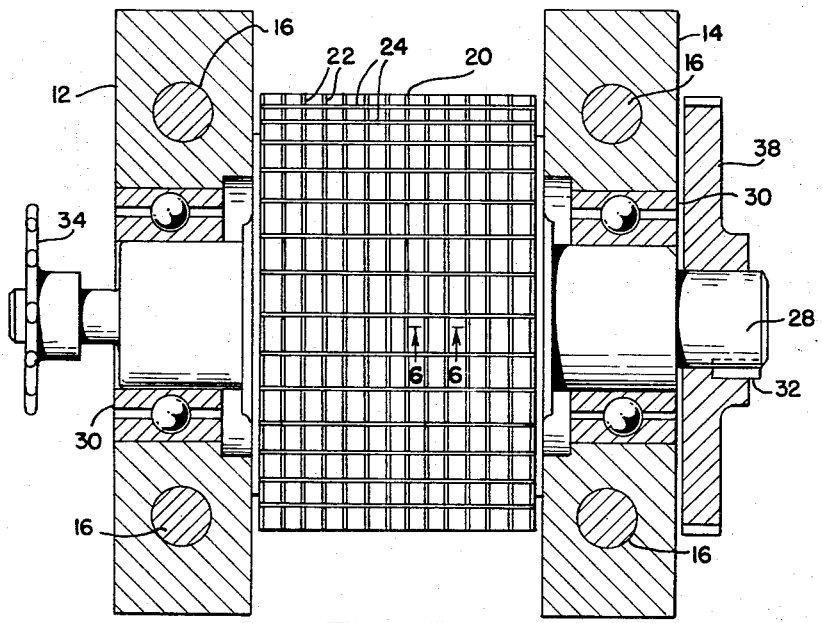
FIGURE 5 is a longitudinal sectional view taken along line 5—5 of FIGURE 1.

In the accompanying drawings is shown a mounting frame, generally designated 10, which for convenience is made up of two front blocks and two rear blocks, designated 12 and 14, respectively.

The two front blocks 12 are arranged side by side and are fixedly joined to one another by through bolts 16, with the rear blocks 14 being similarly arranged side by side and also joined one to another by bolts 16. Journal mounted between the front and rear blocks 12 and 14 are a pair of right and left cylindrically shaped cutting rolls 18 and 20, respectively. Each of the rolls 18 and 20 has formed on its cylindrical surface a first set of circular, parallel, evenly spaced, circumferentially extending blunt cutting edges 22 and a second set of evenly spaced parallel blunt cutting edges 24 perpendicular to the edges 22 and extending parallel to the cylindrical axis of its related cutting roll 18 or 20. Both the rolls 18 and 20 are longitudinally aligned and are arranged in side by side relationship so as to be tangent to one another at about the center axis of the frame 10.

The two rolls 18 and 20 are each fixedly secured to, respectively, longitudinally extending shafts 26 and 28, the shaft 26 being journal mounted in the right hand front and rear blocks 12 and 14, and the shaft 28 being journal mounted in the left hand blocks 12 and 14, with the journal mountings for these shafts 26 and 28 being indicated at 30. The left hand shaft 28 is driven from the front end thereof by means of a chain and sprocket drive 34, and there is secured to each of the shafts 26 and 28 (as by a respective key 32), a respective one of two intermeshing gears 36 and 38, respectively. Because of the action of the intermeshing gears 36 and 38, the cutting rolls 18 and 20 are caused to counterrotate at the same rate of speed and in a manner that each of the cutting edges 24 on the roll 18 meets a corresponding or matching cutting edge 24 on the other roll 20 at the line of tangency of the two rolls 18 and 20. Also, these rolls 18 and 20 are so arranged that each of the circumferential cutting edges 22 on the roll 18 continuously meets with a matching or corresponding circumferential cutting edge 22 on the other roll 20 at the line of tangency of the rolls 18 and 20.

The directions of rotation of the rolls 18 and 20 are such that the cutting edges 22 and 24 on the two rolls 18 and 20 move down and inwardly in an arcuate path toward the line of tangency of the rolls 18 and 20 and continue down and away from one another as they move from this line of tangency. Two sheets 40 of moist cooked dough are fed downwardly between the rolls 18 and 20 in a manner that the sheets 40 lie against one another as they move into the cutting area between the rolls 18 and 20, this cutting area being at the location of the line of tangency of the rolls 18 and 20. It is to be understood that suitable feed means are provided to move each of the dough sheets 40 into the cutting area in a suitable manner, this usually being done so that the sheets 40 are directed downwardly in a direction such that they slant moderately toward one another so that the sheets 40 meet just as they are moving between the rolls 18 and 20. The general plane in which the sheets 40 lie as they are moving between the rolls 18 and 20 coincides approximately with the plane of tangency of the rolls 18 and 20 and can properly be called the "cutting plane" of the rolls 18 and 20.

Figure 7:
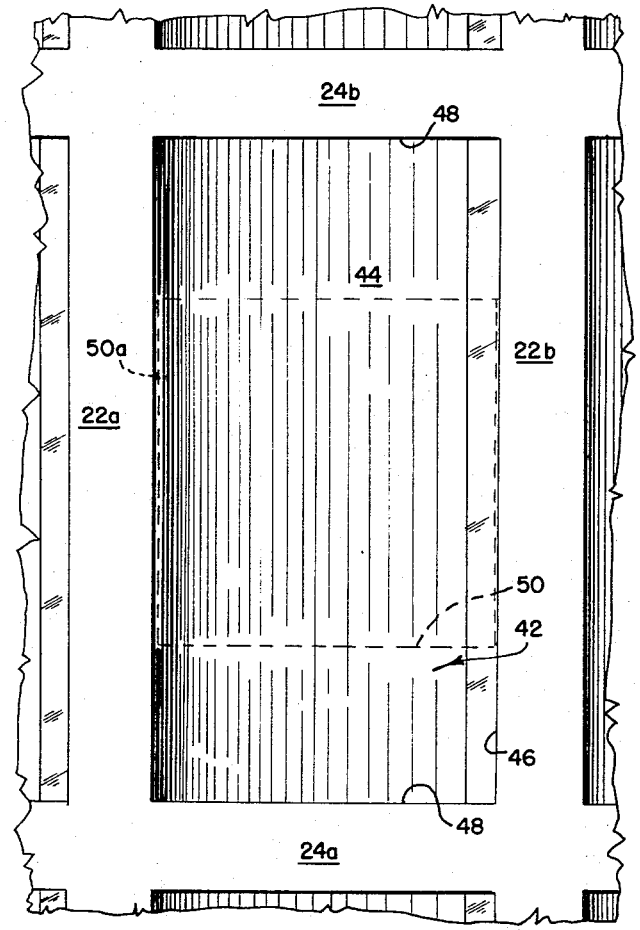
FIGURE 7 is a view drawn to the same scale as FIGURE 6 and taken along line 7—7 of FIGURE 6.

Of particular significance in the present invention is the manner in which a plurality of recesses 42 are formed on the cutting rolls 18 and 20. FIGURE 7 gives an enlarged view of one such recess 42 as seen looking directly into the recess 42, as indicated by numerals 7—7 in FIGURE 6. For convenience, these recesses 42 will be described as being at the location of the line of tangency of the rolls 18 and 20, and the surface portions which form each recess will be oriented with respect to the plane of tangency of the rolls 18 and 20, which plane will be considered as being horizontally disposed. Thus lines or planes parallel to the plane of tangency will be considered as being horizontal, while those perpendicular thereto will be considered vertical. Also, in the following description the cutting edges 22 and 24 will be oriented with respect to the direction of travel of the dough sheets 40 into the rolls 18 and 20. Thus the circumferential cutting edges 22 will be considered as extending longitudinally, while the cutting edges 24 will be considered as transversely extending edges. It can be seen that each recess 42 is bordered or defined by four cutting edge segments, two of these segments being formed from two proximate transverse cutting edges 24 and the other two being formed from proximate longitudinal cutting edges 22, these being numbered 24a and b, and 22a and b, respectively.

The surface which actually forms each recess 42 can, for purposes of description, be considered as being made up of four parts; a slanting base wall 44, a vertical side wall 46 and two vertical end walls 48. The base wall 44 begins at the edge of one of the longitudinal cutting edge segments 22a and extends generally toward the other longitudinal segment 22b, but along a plane which slants from the horizontal (that plane approximately occupied by the segments 22a and b and 24a and b bounding any one recess 42 being considered horizontal) at an angle of about 30° to meet the vertical side wall 46 which extends downwardly from the other longitudinal cutting edge segment 22b. The two end walls 48 extend vertically downward each from a related one of the two transverse cutting edge segments 24a and 24b and meet the base wall 44 and side wall 46. Thus the end walls 48 each have a generally triangular configuration, while the base wall 44 and side wall 46 each have a generally rectangular configuration. It is understood of course that the longitudinal segments 22a and b have a small degree of curvature, but for purposes of describing the configuration of the recesses 42, the cutting edge segments 22a and b and 24a and b can be considered as lying generally in one horizontal plane.

Figure 6:
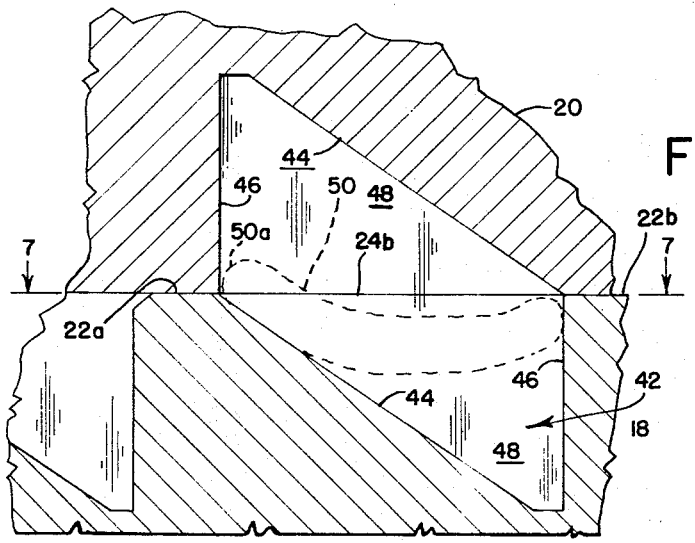
FIGURE 6 is a view drawn to an enlarged scale and taken along line 6—6 of FIGURE 5, to illustrate the configuration of two matching recesses at the line of tangency of the two cutting rolls.

Since, as indicated previously, the cutting edges 22 and 24 come into matching engagement at the line of tangency, each recess 42 on one of the rolls 18 and 20, as it moves into the cutting area, is directly opposite a matching recess 42 from the other roll 18 or 20, as is illustrated in FIGURE 6. It will be noted that the base wall 44 of one recess 42 slopes in a direction opposite from the base wall 44 of its matching recess 42. Thus the two matching recesses at the area of cutting collectively define a chamber, which in the particular arrangement shown herein has the general configuration of a rectangular prism that is somewhat slanted or "rhombic."

It will be noted that the longitudinal segments 22a and b are moderately longer (i.e. about 90% longer) than the transverse segments 24a and b. The reason for this is that the circumferential speed of the rolls 18 and 20 is somewhat faster than the feed rate of the dough sheets 40, which results in the sheets 40 being stretched to some degree as they move into the cutting area between the rolls 18 and 20. Since in the specific apparatus shown herein it is desired to cut generally square multilayered dough pellets, one of which is shown in broken lines at 50, it is necessary to lengthen somewhat the longitudinal cutting edge segments 22a and b with respect to the transverse segments 24a and b, since immediately after being cut, the resulting dough pellets will tend to contract in a longitudinal direction.

As indicated previously, the cutting edges 22 and 24 are all made somewhat blunt so that the dough sheets are sealed or bonded one to another along the lines of cutting. When a pair of matching cutting edge segments 24a or b or 22a or b, one from each of the rolls 18 and 20, come into engagement at the cutting area, the dough located therebetween is pushed together and squeezed out, part into each of the two proximate pellet forming chambers (each chamber being made up of two matching recesses 42). The effect is that each dough pellet 50 so formed tends to be pressed somewhat into one or the other of the matching recesses 42 which collectively define the chamber. This is illustrated in FIGURE 6, wherein the dough pellet 50 is shown being pressed into the recess 42 which appears in FIGURE 6 as the lower recess, and of course the pellet 50 will tend to stick in this recess 42 into which it is pressed.

However, it is important to note that regardless of which of its two related recesses 42 in which the dough pellets 50 become lodged, one longitudinal edge 50a thereof will be proximate that portion of the recess base wall 44 which is adjacent the longitudinal cutting edge segment 22a. Thus this edge 50a of the dough pellet 50 will necessarily extend out from its recess beyond its related cutting edge segment 22a, and after the rolls 18 and 20 have gone through a further increment of travel from the cutting area, this dough pellet edge 50a will be exposed so that the pellet 50 can be removed from its recess 42 simply by exerting a moderate lateral force on the exposed dough pellet edge 50a.

Each of the rolls 18 and 20 is provided with a respective one of two brush units 52 and 54, respectively, each of which comprises a shaft 56 aligned with its related roll 18 or 20. On each shaft is mounted in a helical fashion one or more rows of bristles 58. Each of the brush units 52 and 54 is provided with a chain and sprocket drive 60 which turns the brush unit 52 or 56 in a direction counter to the rotation of its related roll 18 or 20. Also, the helical pattern of the bristles 58 of each of the brush units 52 and 54 is so arranged that the progression of the helix formed by the bristles as its related shaft 56 rotates is in the same direction as that in which the base wall 44 of the proximate recesses 42 slope. Thus, as seen in FIGURE 1 the recesses 42 in the right hand cutting roll 18 slope down or toward the center of the roll 18 in a forward direction, while those of the left hand roll 20 slope toward the center of the roll 20 in a rearward direction.

Since there will be moderate wear on the bristles 58 of each of the brush units 52 and 54, each of the shafts 56 are journal mounted eccentrically in a pair of circular blocks 62 in the frame 10. As the bristles 58 wear, the blocks 62 can be rotated and locked in place by a key 64 to locate each shaft 56 closer to its related roll 18 or 20 so that the bristles 58 properly engage the dough pellets 50 lodged in the recesses 42 of the rolls 18 and 20. Also, to insure that the cutting rolls 18 and 20 engage one another properly, the forward mounting blocks 12 are located with respect to one another by a pair of dowels 66, as are the rear blocks 14. Also, between the blocks 12 and also between the blocks 14, there are provided shims 68, so that by selecting shims of the proper width, the engagement of the rolls 18 and 20 can be more accurately controlled.

In operation, two sheets of dough 40 are fed downwardly into the cutting area between the cutting rolls 18 and 20 in a manner that the two sheets 40 lie one against the other at the location of cutting. As a pair of matching transverse cutting edges 24 travel into the cutting area, each such pair makes a transverse cut to sever as well as bond the dough sheets 40 one to another along the line of cutting. The matching longitudinal cutting edge segments 22a immediately following each such matching set of transverse cutting edges 24 then come into rolling engagement to make longitudinal cuts and in like manner sever and bond the dough sheets 40 along such lines of cutting. The next succeeding pair of matching transverse cutting edges 24 make another cut to complete the formation of a row of dual layered dough pellets 50.

As previously indicated, each of the dough pellets 50 tend to become lodged in one or the other of the two adjacent recesses 42 which define the chamber in which it is formed. Each of the pellets 50 which become lodged in the recesses 42 in the right hand roll 18 will have its rear longitudinal edge 50a exposed where it can easily be engaged by the brush unit 52, while each of those dough pellets 50 which remain lodged in recesses 42 of the left hand roll 20 will have the forward edge 52a thereof exposed to be engaged by the other brush unit 54. The pellets 50 so brushed free of the rolls 18 and 20 are collected in a suitable manner and carried away for further processing.

It should be understood that the foregoing is merely illustrative of a certain embodiment of the invention and many variations may be made by those skilled in the art without departing from the spirit and scope of the invention.

Now therefore we claim:

1. An apparatus to form a plurality of pieces from a material such as a pliable cooked dough, said apparatus comprising:
   (a) a first and a second cutting member, said members being substantially identical with respect to each other,
   (b) cutting edge means on each of said cutting members,
   (c) portions of the cutting edge means of the first cutting member matching with corresponding portions of the cutting edge means of the second cutting member,
   (d) proximate cutting edge portions of each one of said cutting members defining a respective recess therebetween which matches in size and shape with a corresponding recess on the other cutting member defined by corresponding edge portions of the other cutting member,
   (e) said first and second cutting members being movable toward and away from one another in a cutting motion to cut material fed therebetween, and
   (f) each recess having a defining surface portion which begins at one related cutting edge portion of such recess and extends therefrom toward another related cutting edge portion of such recess in a direction sloping away from a general plane defined approximately by said cutting edge portions, whereby when a portion of material being cut is lodge in such recess, the part of said material portion that is proximate said one related cutting edge portion is exposed to permit removal of said material portion from said related recess.

2. The apparatus as recited in claim 1, wherein the recess defining surface portion of a recess on said first cutting member slopes away from said cutting plane in a first predetermined direction, and the recess defining surface portion of a corresponding recess on said second cutting member slopes away from said cutting plane in a second predetermined direction having a substantial component of slope generally opposite to said first predetermined direction.

3. An apparatus to form a plurality of pieces from a material such as pliable cooked dough, said apparatus comprising:
   (a) a first and a second cutting member,
   (b) cutting edge means on each of said cutting members,
   (c) portions of the cutting edge means of the first cutting member matching with corresponding portions of the cutting edge means of the second cutting member,
   (d) proximate cutting edge portions of each one of said cutting members defining a respective recess therebetween which matches with a corresponding recess on the other cutting member defined by corresponding edge portions of the other cutting member,
   (e) said first and second cutting members being movable toward and away from one another in a cutting motion to cut material fed therebetween, and
   (f) each recess having a defining surface portion which begins at one related cutting edge portion of such recess and extends therefrom toward another related cutting edge portion of such recess in a direction sloping away from a general plane defined approximately by said cutting edge portions, whereby when a portion of material being cut is lodged in such recess, the part of said material portion that is proximate said one related cutting edge portion is exposed to permit removal of said material portion from said related recess, each recess of said cutting member having a related first and second cutting edge portion which matches with, respectively, first and second cutting edge portions of a corresponding recess on the second cutting member, each recess on said first cutting member having recess defining surface means which slants with a relatively moderate slope from its first cutting edge portion and slants in a relatively steep slope from its second edge cutting portion, with the corresponding recess having recess defining means which slants from its first cutting edge portion with a relatively steep slope and slants from its second cutting edge portion with a relatively shallow slope.

4. An apparatus to form multi-layered pieces from a plurality of sheets of a material such as pliable cooked dough, said apparatus comprising:
   (a) first and second generally parallel, substantially identical counter-rotating cutting members, each having a cylindrical surface generally tangent to the cylindrical surface of the other, and adapted to receive a plurality of sheets of said material therebetween,
   (b) the cylindrical surface of each cutting member being formed with a plurality of cutting edges arranged in a general crisscross pattern, the cutting edges on the first cutting member matching with corresponding cutting edges on the second cutting member,
   (c) proximate cutting edge portions of each of said cutting members defining a respective recess therebetween which matches in size and shape with a corresponding recess on the other cutting member defined by corresponding cutting edge portions of the other cutting member, and
   (d) each recess having a defining surface portion which begins at one related cutting edge portion of such recess and extends therefrom toward another related cutting edge portion of such recess in a direction sloping away from a general plane defined approximately by proximate cutting edge portions, whereby when a portion of material being cut is lodged in such recess, the part of said material portion proximate said one related cutting edge portion is exposed to permit removal of said material portion from said related recess.

5. An apparatus to form multi-layered pieces from a plurality of sheets of a material such as pliable cooked dough, said apparatus comprising:
   (a) first and second generally parallel, counter-rotating cutting members, each having a cylindrical surface generally tangent to the cylindrical surface of the other, and adapted to receive a plurality of sheets of said material therebetween,
   (b) the cylindrical surface of each cutting member being formed with a plurality of cutting edges arranged in a general criss-cross pattern, the cutting edges on the first cutting member matching with corresponding cutting edges on the second cutting member,
   (c) proximate cutting edge portions of each of said cutting members defining a respective recess therebetween which matches with a corresponding recess on the other cutting member defined by corresponding cutting edge portions of the other cutting member, and
   (d) each recess having a defining surface portion which begins at one related cutting edge portion of such recess and extends therefrom toward another related cutting edge portion of such recess in a direction sloping away from a general plane defined approximately by proximate cutting edge portions, whereby when a portion of material being cut is lodged in such recess, the part of said material portion proximate said one related cutting edge portion is exposed to permit removal of said material portion from said related recess, each recess of said first cutting member having a related first and second cutting edge portion which matches with, respectively, first and second cutting edge portions of a corresponding recess on the second cutting member, each recess on said first cutting member having recess defining surface means which slants with a relatively moderate slope from its first cutting edge portion and slants in a relatively steep slope from its second edge cutting portion, with the corresponding recess having recess defining means which slants from its first cutting edge portion with a relatively steep slope and slants from its second cutting edge portion with a relatively moderate slope.

6. The apparatus as recited in claim 5, wherein each cutting member is formed with a first set of circumferential cutting edges extending circumferentially around the cylinder of its related cutting member and a second set of cutting edges extending across said first set of cutting edges.

7. The apparatus as recited in claim 6, wherein said first and second edge portions are comprised of said circumferential cutting edges, whereby portions of said pieces are exposed proximate said circumferential cutting edges.

8. The apparatus as recited in claim 7, wherein there is removal means for said cutting members, said removal means exerting a force component over each of said rolls generally transverse of said circumferential cutting edges.

9. The apparatus as recited in claim 8, wherein said removal means comprises a set of brushes, one for each cutting member, each brush being arranged in a general helix, the axis of which is generally parallel to the axis of its related cutting member, each of said brushes rotating with its related cutting member so that the helix of each brush moves transversely of the circumferential cutting edges of its related cutting member.

10. An apparatus to form multi-layered pieces from a plurality of sheets of a material such as pliable cooked dough, said apparatus comprising:
   (a) first and second generally parallel, counter-rotating cutting members, each having a cylindrical surface generally tangent to the cylindrical surface of the other, and adapted to receive a plurality of sheets of said material therebetween,
   (b) the cylindrical surface of each cutting member having a first set of circumferential cutting edges and a second set of transverse cutting edges extending across said first set of cutting edges, which cutting edges match with corresponding cutting edges of the other cutting member,
   (c) proximate portions of said first and second sets of cutting edges on each cutting member defining a respective one of a plurality of recesses, each of which matches with a corresponding recess on the other cutting member, each recess on each cutting member being bounded by portions of two proximate circumferential cutting edges and portions of two proximate transverse cutting edges,
   (d) each recess on the first cutting member having a surface means portion sloping moderately in a first direction from a location at one of its said circumferential cutting edge portions and sloping relatively steeply from the other of its said circumferential cutting edge portions, and
   (e) each recess on the second cutting member having a surface means portion sloping moderately in a direction generally opposite to said first direction from a location at one of its said circumferential cutting edge portions and sloping relatively steeply from the other of its said circumferential cutting edge portions, whereby when each recess from the first cutting member comes proximate to its matching recess on the second cutting member so as to define a chamber therewith, the circumferential cutting edge portions of each of matching recesses at which its related surface defining means begins its moderate slope are oppositely disposed in said chamber.

11. The apparatus as recited in claim 10, wherein there is material removal means for each of said cutting members to exert force across said circumferential cutting edges of said cutting members, the force being exerted across the circumferential cutting edges of said first cutting member in the direction of said moderate slope of the recesses of said first cutting member, and the force being exerted across the circumferential cutting edges of the second cutting member in the direction of moderate slope of the recesses of said second cutting member.

12. The apparatus as recited in claim 11, wherein said removal means comprises brush means for each cutting member, each of said brush means having a component of motion across its related cutting member in the direction of slope of the recesses of its related cutting member.

References Cited
UNITED STATES PATENTS

| | | | |
|---|---|---|---|
| 642,220 | 1/1900 | Green | 83—101 X |
| 705,040 | 7/1902 | Copland | 83—101 X |
| 1,635,166 | 7/1927 | Albee | 83—165 X |
| 2,145,048 | 1/1939 | Hagen | 83—343 X |

JAMES M. MEISTER, *Primary Examiner.*